(12) United States Patent
Choi et al.

(10) Patent No.: US 12,101,031 B2
(45) Date of Patent: Sep. 24, 2024

(54) APPARATUS AND METHOD FOR CONTROLLING LLC RESONANCE CONVERTER

(71) Applicants: HYUNDAI MOTOR COMPANY, Seoul (KR); KIA CORPORATION, Seoul (KR)

(72) Inventors: Min Seong Choi, Daejeon (KR); In Yong Yeo, Bucheon-si (KR); Dae Woo Lee, Incheon (KR); Jin Young Yang, Hanam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 279 days.

(21) Appl. No.: 17/696,217

(22) Filed: Mar. 16, 2022

(65) Prior Publication Data
US 2023/0026817 A1 Jan. 26, 2023

(30) Foreign Application Priority Data
Jul. 22, 2021 (KR) .................. 10-2021-0096610

(51) Int. Cl.
*H02M 3/335* (2006.01)
*B60L 53/22* (2019.01)

(52) U.S. Cl.
CPC ......... *H02M 3/33569* (2013.01); *B60L 53/22* (2019.02); *B60L 2210/10* (2013.01)

(58) Field of Classification Search
CPC ................................................ H02M 3/33569
See application file for complete search history.

(56) References Cited

U.S. PATENT DOCUMENTS

2021/0218342 A1\* 7/2021 Zmood ............... H02M 7/5387
2022/0286055 A1\* 9/2022 Baranwal ................. H02J 7/06
(Continued)

FOREIGN PATENT DOCUMENTS

CN      109067229 A  * 12/2018  ........ H02M 3/33523
CN      109687715 A  *  4/2019
(Continued)

OTHER PUBLICATIONS

Zhigang Liang "A New Wide Input Range High Efficiency Photovoltaic Inverter" (Year: 2010).*

(Continued)

*Primary Examiner* — Sisay G Tiku
(74) *Attorney, Agent, or Firm* — MCDONNELL BOEHNEN HULBERT & BERGHOFF LLP (57) ABSTRACT

The present disclosure relates to an apparatus and a method for controlling an LLC resonance converter. The apparatus includes a converter connected to an input terminal, including a plurality of switching elements constituting a bridge circuit, and enabling a topology change in the form of a full bridge and a half bridge; and a controller detecting a charge measurement value of a battery being charged with a power transferred by the converter, and changing a topology of the converter based on the charge measurement value. Since battery charging is performed by changing the topology of the converter in accordance with the charge measurement value of the battery, the LLC resonance converter can be controlled at an optimized frequency, the efficiency is increased, and cost savings can be achieved.

12 Claims, 6 Drawing Sheets

(56) References Cited

U.S. PATENT DOCUMENTS

| | | | | |
|---|---|---|---|---|
| 2023/0040992 A1* | 2/2023 | Wei | ................... | H02M 3/33573 |
| 2024/0039413 A1* | 2/2024 | Danekar | ................. | B60L 53/30 |

FOREIGN PATENT DOCUMENTS

| | | | | | |
|---|---|---|---|---|---|
| CN | 115224944 A | * | 10/2022 | | |
| IN | 202221049850 A | * | 10/2023 | | |
| JP | 2018-061336 A | | 4/2018 | | |
| KR | 20180004655 A | * | 1/2018 | | |
| KR | 10-2008420 B1 | | 8/2019 | | |
| KR | 102530939 B1 | * | 5/2023 | | |
| WO | WO-2022135744 A1 | * | 6/2022 | .............. | B60L 53/14 |
| WO | WO-2024022941 A1 | * | 2/2024 | .............. | B60L 53/22 |

OTHER PUBLICATIONS

Lu Qu "Variable CLLC Topology Structure Technique for a bidirectional on Board Charger of Electric Vehicle" (Year: 2019).*
Liming Liu "Stack:ed DC-DC Converter with Wide Voltage Range" (Year: 2020).*

* cited by examiner

APPARATUS AND METHOD FOR CONTROLLING LLC RESONANCE CONVERTER

CROSS REFERENCE TO RELATED APPLICATIONS

The present application claims priority of Korean Patent Application No. 10-2021-0096610 filed on Jul. 22, 2021, the entire contents of which is incorporated herein for all purposes by this reference.

BACKGROUND

Field

The present disclosure relates to an apparatus and a method for controlling an LLC resonance converter, and more particularly, to an apparatus and a method for controlling an LLC resonance converter, which can change topology so as to be able to operate at an optimum frequency.

Description of the Related Art

An eco-friendly vehicle, in which a battery that is an energy source of a driving motor in the vehicle is charged, such as an electric vehicle or a plug-in hybrid electric vehicle, has an on-board charger for converting an external AC power into a DC power and outputting the DC power for charging the battery.

In general, the on-board charger includes a power factor correction circuit outputting a DC through compensation of a power factor of the external AC power, and a DC-DC converter converting the DC output of the power factor correction circuit into a DC charging voltage of the battery. Here, an LLC resonance converter using LC resonance may be adopted as the DC-DC converter.

Since the LLC resonance converter has characteristics determined by a resonance frequency that is determined by two inductors and one capacitor, which correspond to a resonance tank around a transformer, it is called the LLC resonance converter. Since the LLC resonance converter uses resonance current being generated by the two inductors and one capacitor, it has great reduction of a switching loss and a diode loss. As the LLC resonance converter, a full bridge (FB) LLC converter structure is often used.

Meanwhile, the FB LLC converter in the related art is unable to operate at an optimum switching frequency due to constraints, such as a minimum/maximum voltage of a link capacitor, a voltage range and a charging current of a high-voltage battery, and the maximum switching frequency of a converter according to MCU memory constraints.

The foregoing description of the background technology is intended merely to help the understanding of the background of the present disclosure, and is not intended to mean that the present disclosure falls within the purview of the related art that is already known to those of ordinary skill in the art.

SUMMARY

An aspect of the present disclosure is to provide an apparatus and a method for controlling an LLC resonance converter, which can achieve cost savings through providing improved control precision, an increased efficiency, and a wider operation range by measuring a charging status value representing a voltage level charged in a battery being charged with a voltage converted by a converter, changing a topology of the converter based on the measured charging status value, and making the converter operate using an optimum frequency in accordance with the charging status value of the battery. The present disclosure is not limited to the above-described subject matters, and other subject matters may be derived from the following descriptions.

In one aspect of the present disclosure, an apparatus for controlling an LLC resonance converter includes a converter connected to an input terminal, including a plurality of switching elements constituting a bridge circuit, and enabling a topology change in the form of a full bridge and a half bridge, and a controller detecting a charge measurement value of a battery being charged with a power transferred by the converter, and changing a topology of the converter based on the charge measurement value.

The controller may change the topology of the converter by controlling on/off of the plurality of switching elements based on the charge measurement value.

The controller may change the topology of the converter in the form of the half bridge in case that the detected charge measurement value is smaller than a reference voltage.

The controller may change the topology of the converter in the form of the full bridge in case that the detected charge measurement value is equal to or larger than the reference voltage.

The plurality of switching elements may include first and third switches connected in series to a first leg of the input terminal and second and fourth switches connected in series to a second leg of the input terminal, and the converter may further include a resonance tank having one end connected to the first leg between the first and third switches and the other end connected to the second leg between the second and fourth switches, and resonating through reception of a power formed by switching of the plurality of switching elements; and a plurality of relays coupled between the plurality of switching elements and the resonance tank. The controller may change the topology of the converter by controlling operations of the plurality of relays based on the charge measurement value.

The plurality of relays may include a first relay having one end connected to the second leg between the second and fourth switches and the other end being able to be coupled to a first position in which the other end is connected to the first leg between the first and third switches or a second position in which the other end is connected to the other end of the resonance tank under the control of the controller, and a second relay having one end connected to the other end of the resonance tank and the other end being able to be coupled to a third position in which the other end is connected to the second leg between the second and fourth switches and a fourth position connected between the third and fourth switches under the control of the controller.

The converter may have the topology in the form of a full bridge in case that the other end of the first relay is coupled to the second position and the other end of the second relay is coupled to the third position by the controller, and the converter may have the topology in the form of a half bridge in case that the other end of the first relay is coupled to the first position and the other end of the second relay is coupled to the fourth position by the controller.

In another aspect of the present disclosure, a method for controlling an LLC resonance converter includes detecting a charge measurement value of a battery, and changing a topology of a converter transferring a power for charging the battery based on the detected charge measurement value.

The topology of the converter may be in the form of a full bridge or a half bridge.

The changing the topology of the converter may be performed by controlling on/off of a plurality of switches disposed at an input terminal of the converter.

The changing the topology of the converter may change the topology of the converter in the form of the half bridge in case that the detected charge measurement value is smaller than a reference voltage.

The changing the topology of the converter may change the topology of the converter in the form of the full bridge in case that the detected charge measurement value is equal to or larger than the reference voltage.

The converter may operate at a switching frequency that is lower than a resonance frequency.

If the detected charge measurement value is equal to the reference voltage, the converter may operate at the switching frequency that is equal to the resonance frequency, whereas if the detected charge measurement value is larger than the reference voltage, the converter may operate at the switching frequency that is lower than the resonance frequency.

The changing the topology of the converter may be performed by controlling on/off of a plurality of relays disposed at an input terminal of the converter.

The present disclosure has a technical effect of cost savings through providing of an improved control precision, an increased efficiency, and a wider operation range by measuring the charging status value representing the voltage level charged in the battery being charged with the voltage converted by the converter, changing the topology of the converter based on the measured charging status value, and making the converter operate using an optimum frequency in accordance with the charging status value of the battery.

BRIEF DESCRIPTION OF THE FIGURES

The above and other objects, features and advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

The present disclosure relates to an apparatus and a method for detecting a charging status value representing a voltage level charged in a battery and controlling a topology of an LLC resonance converter according to the detected charging status value, and hereinafter, it may be simply referred to as a "converter control apparatus" and a "converter control method".

Figure 1:
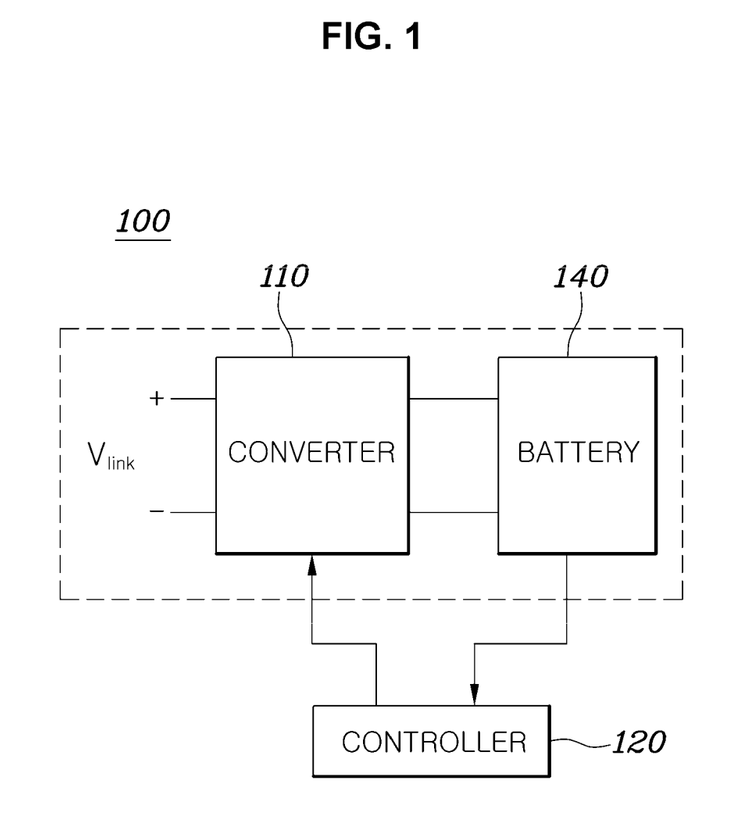
FIG. 1 is a block diagram of an apparatus for controlling an LLC resonance converter according to an embodiment of the present disclosure.

FIG. 1 is a block diagram of an apparatus for controlling an LLC resonance converter according to an embodiment of the present disclosure.

Referring to FIG. 1, the converter control apparatus 100 according to an embodiment of the present disclosure is composed of a converter 110 and a controller 120.

The converter 110 converts a DC output of a power factor correction circuit (not illustrated), which compensates for a power factor of an external AC power and outputs a DC, into a DC charging voltage of the battery 140. The converter 110 according to an embodiment of the present disclosure may be an LLC resonance converter using LC resonance.

Figure 2A:
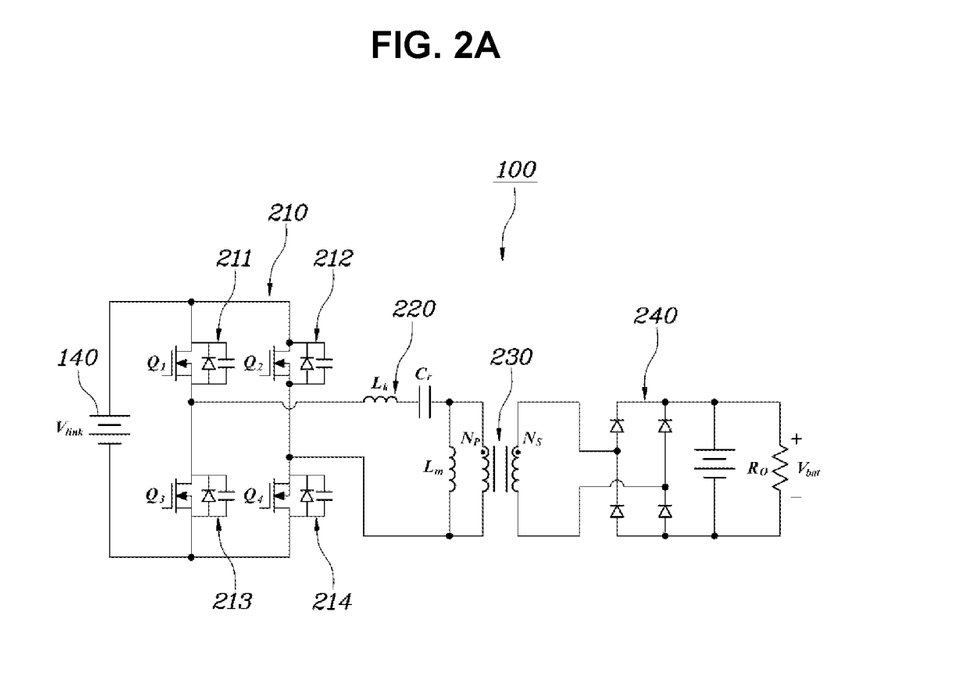
FIGS. 2A and 2B are diagrams illustrating an operation of an LLC resonance converter according to an embodiment of the present disclosure.
Figure 2B:
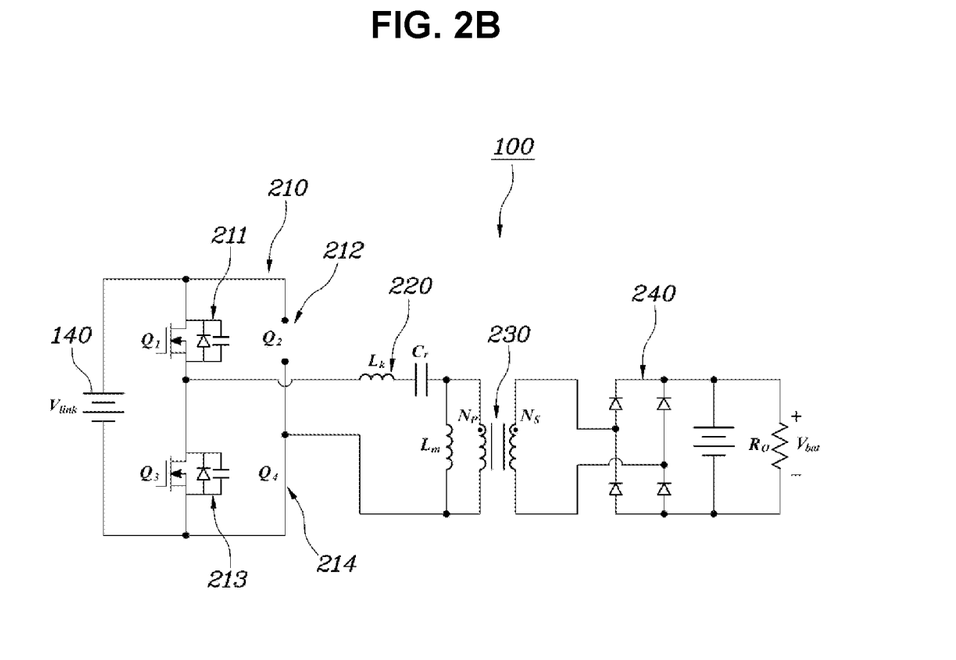

FIGS. 2A and 2B illustrate the converter 110 according to an embodiment of the present disclosure. Referring to FIGS. 2A and 2B, the converter 110 according to an embodiment of the present disclosure may include a switching element unit 210 in which a plurality of switching elements 211, 212, 213, and 214 are connected to an input terminal to constitute a full bridge circuit, a resonance tank 220 being provided with a power formed by shorting and opening of the plurality of switching elements 211, 212, 213, and 214, a transformer 230 having a primary coil connected to the resonance tank 220 and a secondary coil connected to an output side to which a charging target is connected, and a rectifying circuit 240 connected to the secondary coil of the transformer 230.

The converter 110 according to an embodiment of the present disclosure may be able to change a topology in the form of a full bridge or a half bridge through an operation of an internal element of the converter.

The controller 120 detects a charging status value representing the level of the voltage charged in the battery that is charged using a DC charging voltage converted by the converter 110, and changes the topology of the converter 110 by controlling the converter 110 based on the detected charging status value.

More specifically, if the detected charging status value is smaller than a reference voltage value, the controller 120 may change the topology of the converter 110 in the form of the half bridge, whereas if the detected charging status value is equal to or larger than the reference voltage value, the controller 120 may change the topology of the converter 110 in the form of the full bridge.

In an embodiment of the present disclosure, the reference voltage may be a nominal voltage of a high-voltage battery.

In an embodiment of the present disclosure, the controller 120 may change the topology of the converter by controlling an on/off of the plurality of switching elements 211, 212, 213, and 214 of the converter 110 based on the detected charging status value.

In order to help understanding of the converter topology change, the operation of the converter according to an embodiment of the present disclosure will be described with reference to FIGS. 2A and 2B. The switching element unit 210 according to an embodiment of the present disclosure may be composed of a first switching element 211 and a third switching element 213 connected in series to a first leg of the input terminal, and a second switching element 212 and a fourth switching element 214 connected in series to a second leg of the input terminal.

Referring to FIG. 2A, the controller 120 may make the converter 110 operate in the form of the full bridge by controlling the respective switching elements 211, 212, 213, and 214 so that the switching elements 212 and 213 are turned on/off when the switching elements 211 and 214 among the plurality of switching elements 211, 212, 213, and 214 are turned on/off.

Referring to FIG. 2B, in an embodiment of the present disclosure, the controller 120 may make the converter 110 operate in the form of the half bridge, in which the converter 110 is operated by two switching elements, that is, the first switching element 211 and the third switching element 213, by controlling the switching elements so that the second switching element 212 is always opened and the fourth switching element 214 is always shorted.

In another embodiment of the present disclosure, the controller 120 may make the converter 110 operate in the form of the half bridge by controlling the respective switching elements 211, 212, 213, and 214 so that the second switching element 212 is always shorted and the fourth switching element 214 is always opened, or so that the first switching element 211 is always opened and the third switching element 213 is always shorted, or so that the first switching element 211 is always shorted and the third switching element 213 is always opened.

In case that the converter 110 operates in the form of the half bridge as described above, it is controlled that the switching on/off operation is performed only with respect to the two switching elements (e.g., the first switching element 211 and the third switching element 213) and the always on or off operation is maintained with respect to the two remaining switching elements (e.g., the second switching element 212 and the fourth switching element 214), and thus the efficiency can be maximized.

If the charging status value of the high-voltage battery 140 is smaller than a reference voltage, which is the nominal voltage of the high-voltage battery 140, the controller 120 controls the switching elements so that the converter 110 is in the form of the half bridge.

If the converter 110 is made to operate as the half bridge in case that the charging status value of the high-voltage battery, that is, the voltage charged in the battery, is a low voltage (i.e., if the voltage is lower than the reference voltage), the optimized operation can be performed at the switching frequency that is lower than that when the converter operates in the form of the full bridge.

In an embodiment of the present disclosure, if the charging status value of the high-voltage battery 140 is smaller than the reference voltage, the controller 120 may control the switching elements by making the switching frequency of the switching elements 211, 212, 213, and 214 lower than the resonance frequency.

For example, in order for an LLC converter of a full bridge structure to charge the high-voltage battery of 360V/20A, the controller 120 should control the switching elements to have the switching frequency of 250 kHz at the link capacitor voltage of 570V, but the controller 120 can control the switching elements 211, 212, 213, and 214 so that an LLC converter of a half bridge structure has the switching frequency of 165 kHz, which is lower than the resonance frequency of 172 kHz, at the link voltage of 670V. As described above, by controlling the respective switching elements 211, 212, 213, and 214 at the switching frequency that is lower than the resonance frequency, the LLC converter of the half bridge structure can operate at the switching frequency in which a zero-current switch (ZCS) and a zero-voltage switch (ZVS) are all possible, and thus can operate with high efficiency and advantageous element heating features in a state where it is more optimized than the LLC converter of the full bridge structure.

If the charging status value of the high-voltage battery, that is, the voltage charged in the battery, is equal to or higher than the reference voltage, or if the voltage charged in the battery is near the nominal voltage or in the high-voltage range, the controller 120 controls the switching elements 211, 212, 213, and 214 so that the converter 110 is in the form of the full bridge.

In an embodiment of the present disclosure, if the voltage charged in the battery is equal to the reference voltage or is near the nominal voltage, the controller 120 may control the switching frequency of the switching elements 211, 212, 213, and 214 to be equal to the resonance frequency, whereas if the voltage charged in the battery is higher than the reference voltage or is in the high-voltage range, the controller 120 may control the switching elements so that the switching frequency of the switching elements 211, 212, 213, and 214 becomes lower than the resonance frequency.

Figure 3A:
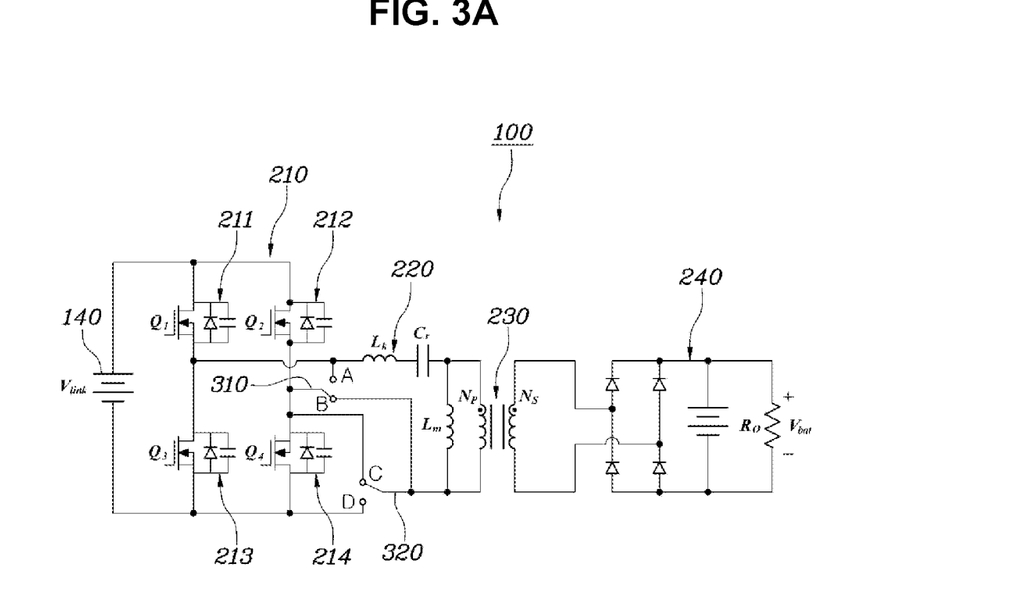
FIGS. 3A and 3B are diagrams illustrating an LLC resonance converter added with relays according to an embodiment of the present disclosure.
Figure 3B:
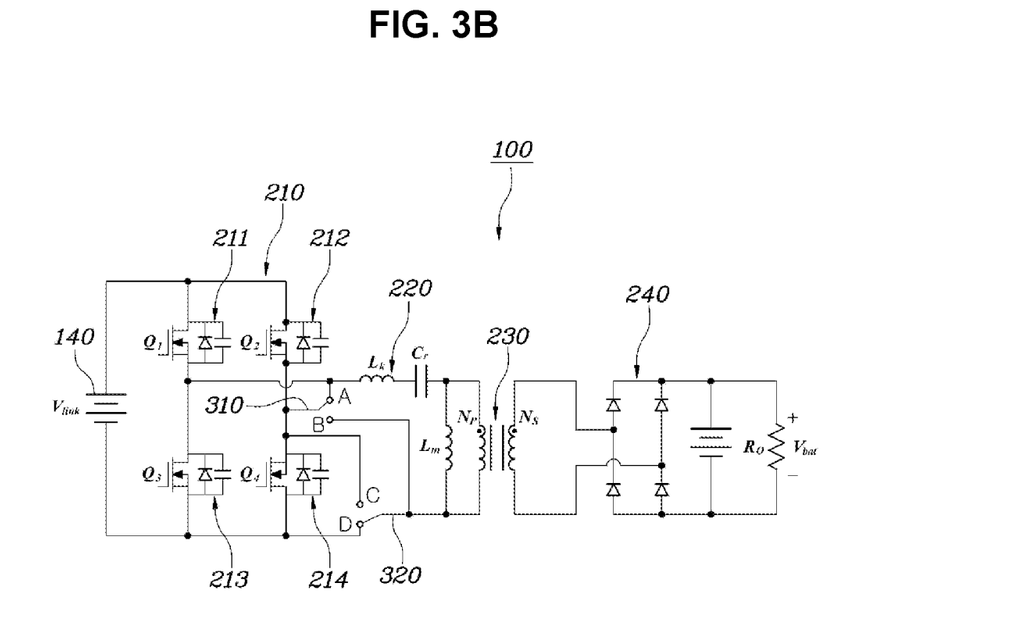

FIGS. 3A and 3B are diagrams illustrating an LLC resonance converter added with relays according to an embodiment of the present disclosure.

Referring to FIGS. 3A and 3B, the converter 110 according to an embodiment of the present disclosure may be configured to include a switching element unit 210 in which a plurality of switching elements 211, 212, 213, and 214 are connected to an input terminal to constitute a full bridge circuit, a resonance tank 220 being provided with a power formed by shorting and opening of the plurality of switching elements 211, 212, 213, and 214, a transformer 230 having a primary coil connected to the resonance tank 220 and a secondary coil connected to an output side to which a charging target is connected, a rectifying circuit 240 connected to the secondary coil of the transformer 230, and a plurality of relays 310 and 320 disposed between the plurality of switching elements 211, 212, 213, and 214 and the resonance tank 220 to change a connection state between the plurality of switching elements 211, 212, 213, and 214 and the resonance tank 220 under the control of the controller 120.

The switching element unit 210 according to an embodiment of the present disclosure may be composed of a first switching element 211 and a third switching element 213 connected in series to a first leg of the input terminal, and a second switching element 212 and a fourth switching element 214 connected in series to a second leg of the input terminal, and the resonance tank 220 may be configured to have one end connected to the first leg between the first switch and the third switch and the other end connected to the second leg between the second switch and the fourth switch.

In an embodiment of the present disclosure, the plurality of relays 310 and 320 may include a first relay 310 having one end connected to the second leg between the second switch and the fourth switch and the other end being able to be coupled to a first position A in which the other end is connected to the first leg between the first switch and the third switch or a second position B in which the other end is connected to the other end of the resonance tank under the control of the controller 120, and a second relay 320 having one end connected to the other end of the resonance tank and the other end being able to be coupled to a third position C in which the other end is connected to the second leg between the second switch and the fourth switch and a fourth position D connected between the third switch and the fourth switch under the control of the controller.

The controller 120 detects the charging status value representing the level of the voltage charged in the battery that is charged using the DC charging voltage converted by the converter 110, and changes the topology of the converter 110 by controlling the plurality of relays 310 and 320 based on the detected charging status value.

More specifically, if the detected charging status value is smaller than the reference voltage value, the controller 120 may change the topology of the converter 110 in the form of the half bridge, whereas if the detected charging status value is equal to or larger than the reference voltage value, the controller 120 may change the topology of the converter 110 in the form of the full bridge.

In an embodiment of the present disclosure, the reference voltage may be a nominal voltage of a high-voltage battery.

In order to help understanding of the converter topology change using the relays 310 and 320, the operation of the converter according to an embodiment of the present disclosure will be described with reference to FIGS. 3A and 3B.

FIG. 3A illustrates that the converter operates in the form of the full bridge according to the operation of the relays under the control of the controller 120.

Referring to FIG. 3A, the controller 120 may make the converter operate in the form of the full bridge by controlling the relays 310 and 320 so that the other end of the first relay 310 is coupled to the second position B, and the other end of the second relay 320 is coupled to the third position C.

More specifically, referring to FIG. 3A, by the operation of the first relay 310 and the second relay 320, the second leg between the second switching element 212 and the fourth switching element 214 is connected to the other end of the resonance tank 220, and thus the converter operates in the same manner as a general full bridge circuit.

FIG. 3B illustrates that the converter operates in the form of the half bridge according to the operation of the relays under the control of the controller 120.

Referring to FIG. 3B, the controller 120 may make the converter 110 operate in the form of the half bridge by controlling the relays 310 and 320 so that the other end of the first relay 310 is coupled to the first position A, and the other end of the second relay 320 is coupled to the fourth position D.

More specifically, referring to FIG. 3B, by the operation of the first relay 310 and the second relay 320, the switching elements 211, 212, 213, and 214 are coupled in parallel to one another (the first switching element 211 and the second switching element 212 are connected in parallel, and the third switching element 213 and the fourth switching element 214 are connected in parallel), and thus the converter 110 can operate in the form of the half bridge. In case that the converter 110 operates in the form of the half bridge through the operation of the relays 310 and 320, there is a very big advantage as follows.

Since two switches are not used for the topology change in the form of the half bridge using the switching elements 211, 212, 213, and 214 illustrated in FIG. 2B, the power that can be output by the converter 110 becomes a half of the power in the form of the full bridge. However, in case that the converter 110 operates in the form of the half bridge using the relays 310 and 320 as shown in FIG. 3B, the respective switching elements 211, 212, 213, and 214 are connected in parallel to one another, and thus the power that can be output by the converter 110 becomes equal to the power in the form of the full bridge.

Since the relays 310 and 320 are very inexpensive as compared with the switching elements, and in case of changing the topology of the converter 110 using the relays 310 and 320, there is a gain in the output current during the half bridge operation, the high-performance/high-efficiency half bridge LLC operation is possible at low costs.

Figure 4A:
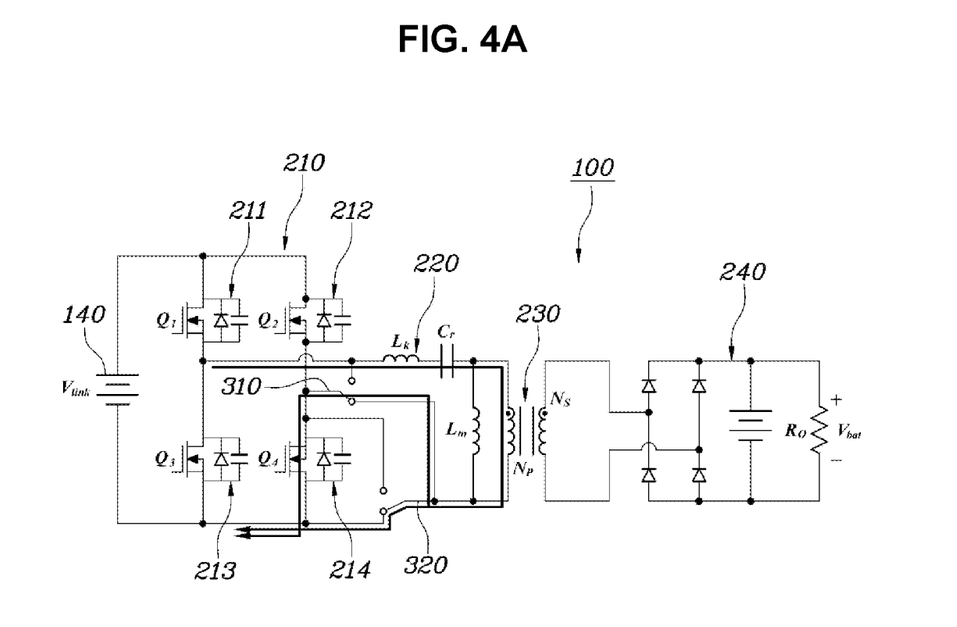
FIGS. 4A, 4B, and 4C are diagrams illustrating an example of an operation of an LLC resonance converter illustrated in FIGS. 3A and 3B.
Figure 4B:
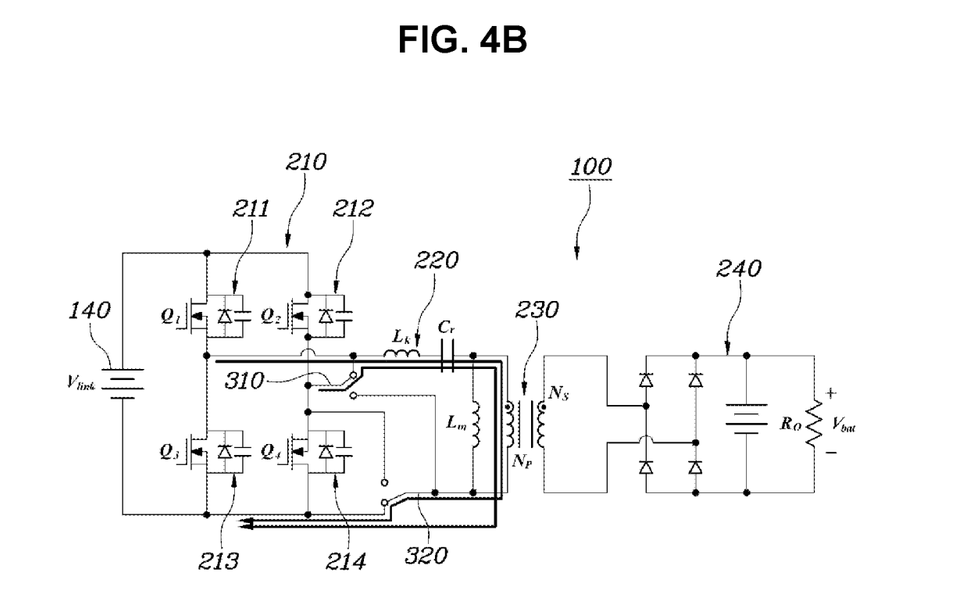
Figure 4C:
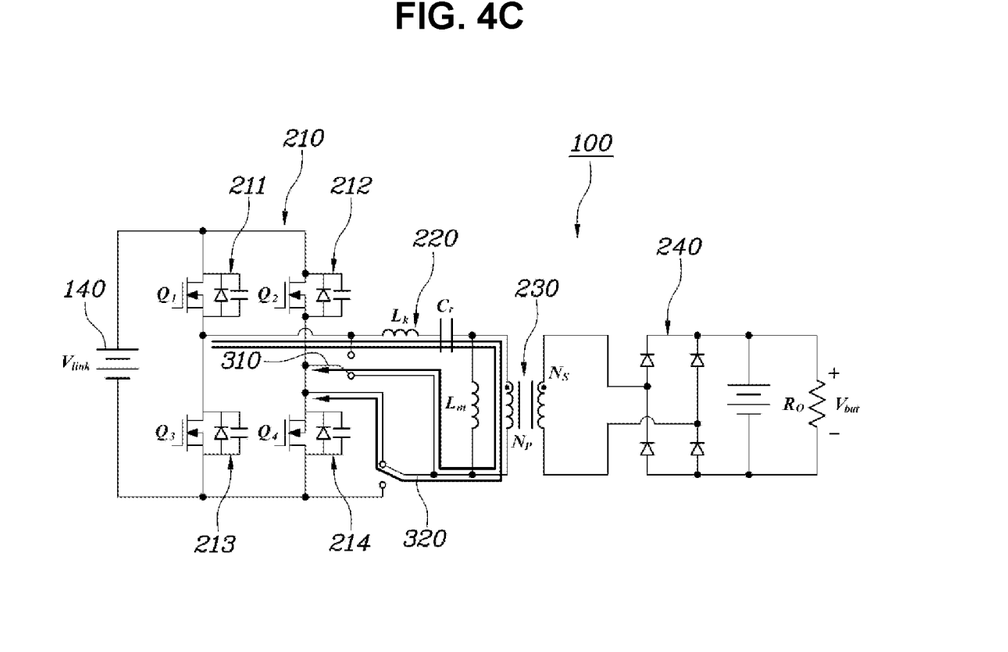

FIGS. 4A, 4B, and 4C are diagrams illustrating an example of an operation of an LLC resonance converter illustrated in FIGS. 3A and 3B. Arrows illustrated on the circuit diagrams of FIGS. 4A, 4B, and 4C express current flows.

FIG. 4A illustrates the operations of relays 310 and 320 and switching elements 211, 212, 213, and 214 and the consequent current flow when the charging status value of a battery 140, being detected by a controller 120, belongs to a predetermined low-voltage range (or is smaller than a reference voltage), and the load is in a low load state.

When the charging status value of the battery 140 is in the low-voltage range and the load is in the low load state, the controller 120 controls to make the other end of the first relay come in contact with the second position B and to make the other end of the second relay come in contact with the fourth position D, and controls to make the second switching element 212 be always opened and to make the fourth switching element 214 be always shorted, so that the half bridge operation that is subsequently the same as the half bridge form illustrated in FIG. 2B can be performed.

As shown in FIG. 4A, since the converter 110 operates in the form of the half bridge by controlling the switching elements 211, 212, 213, and 214 and the relays 310 and 320 when the charging status value of the battery 140 is in the low-voltage range and the load is in the low load state, the ZVS and ZCS operations can be performed, and since only two switches (e.g., the first switch 211 and the third switch 213) perform the switching operation, the switching operation can be minimized and the efficiency can be maximized. Further, since the relays perform parallel operations, the efficiency can be increased as compared with the existing converter.

FIG. 4B illustrates the operation of relays 310 and 320 and the consequent current flow when the charging status value of a battery 140, being detected by a controller 120, belongs to a predetermined low-voltage range (or is smaller than a reference voltage), and the load is in a high load state.

When the charging status value of the battery 140 is in the low-voltage range and the load is in the high load state, the controller 120 controls to make the other end of the first relay 310 come in contact with the first position A and to make the other end of the second relay 320 come in contact with the fourth position D, and thus the converter 110 can operate in the form of the half bridge illustrated in FIG. 3B.

As shown in FIG. 4B, since the converter 110 operates in the form of the half bridge by connecting the switching elements 211, 212, 213, and 214 in parallel using the relays 310 and 320 when the charging status value of the battery 140 is in the low-voltage range and the load is in the high load state, the same output as that in the form of the full bridge is possible, the ZVS and ZCS operations can be performed, and the turn-on loss can be minimized.

FIG. 4C illustrates the operation of relays 310 and 320 and the consequent current flow when the charging status value of a battery 140, being detected by a controller 120, belongs to a predetermined high-voltage range (or exceeds a reference voltage), and the load is in a high load state.

When the charging status value of the battery 140 is in the high-voltage range and the load is in the high load state, the controller 120 controls to make the other end of the first relay 310 come in contact with the second position B and to make the other end of the second relay 320 come in contact with the third position C, and thus the converter 110 can operate in the form of the full bridge illustrated in FIG. 3A.

As shown in FIG. 4C, since the converter 110 operates in the form of the full bridge using the relays 310 and 320 when the charging status value of the battery 140 is in the high-voltage range and the load is in the high load state, the ZVS and ZCS operations can be performed, and the efficiency that is equal to that of the existing converter can be achieved through the parallel operation of the relays.

The converter control method according to an embodiment of the present disclosure can be performed by a single or a plurality of controllers mounted in the vehicle. Further, the converter control method according to an embodiment of the present disclosure can be performed by a single controller, that is, one integrated controller, and in the following description, the controller may commonly call a plurality of controller, or may be one integrated controller performing the functions.

Figure 5:
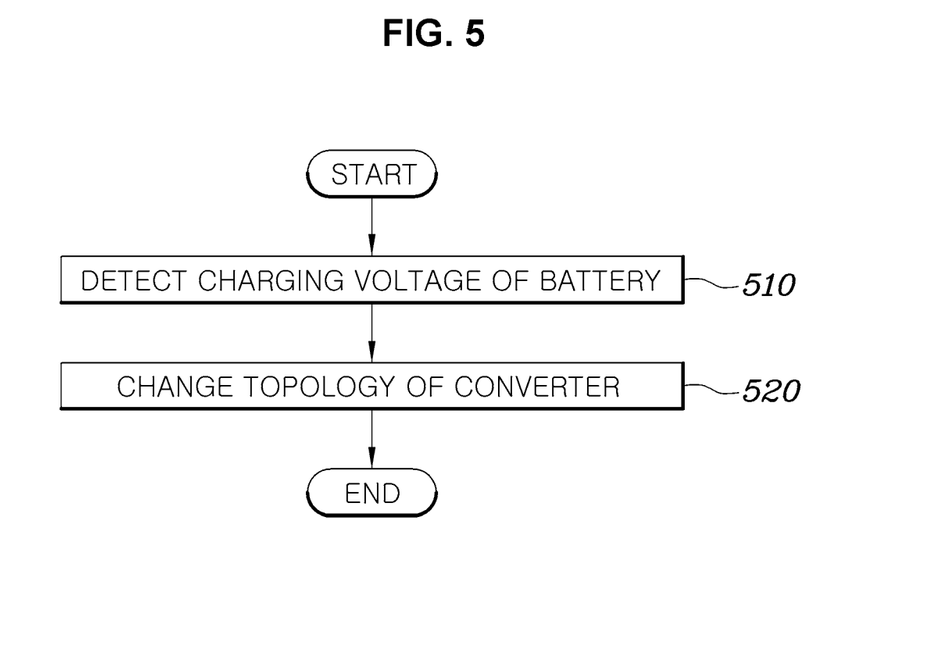
FIG. 5 is a flowchart of a method for controlling an LLC resonance converter according to an embodiment of the present disclosure.

FIG. 5 is a flowchart of a converter control method according to an embodiment of the present disclosure.

Referring to FIG. 5, the converter control method according to an embodiment of the present disclosure may include detecting a charge measurement value of a battery, and changing a topology of a converter.

In step 510, the controller detects the charge measurement value of the battery being charged with a voltage converted through the converter.

In an embodiment of the present disclosure, the battery, from which the charge measurement value is detected, may be a main battery that plays a role of supplying a power of a motor. Further, the charge measurement value of the battery, which is the detection target, means the level of the voltage charged in the battery. For example, in case of charging the battery having an open circuit voltage of 500V, the charge measurement value of the battery may be increased to 600V or 700V with the progress of the charging.

A method for detecting the charge measurement value of the battery is not limited, and may be easily adopted and used by an ordinary skilled person in the art. In an embodiment of the present disclosure, a battery management system (BMS) may detect the charge measurement value of the battery using an open circuit voltage (OCV) after an ignition key-on (IG ON) is performed. In another embodiment of the present disclosure, the BMS may detect the charge measurement value of the battery by counting the battery charging current, voltage, and amount of electricity (ampere-hour (Ah)) during the battery charging.

In step 520, the controller changes the topology of the converter based on the detected charge measurement value of the battery. More specifically, the controller changes the topology of the converter connected to the battery to charge the battery with the converted voltage based on the detected charge measurement value of the battery.

In an embodiment of the present disclosure, the topology of the converter may be in the form of the full bridge or the half bridge, and the controller may control the converter to operate in the form of the full bridge or the half bridge based on the detected charge measurement value of the battery.

Hereinafter, the structure of the converter that can change the topology and the method for changing the topology of the converter will be described in more detail.

According to the embodiment of the present disclosure, there is a technical effect of cost savings through providing of an improved control precision, an increased efficiency, and a wider operation range by detecting the charge measurement value of the battery, changing the topology of the converter according to the detected charge measurement value, and making the converter operate using the optimum frequency in accordance with the charging state of the battery.

Figure 6:
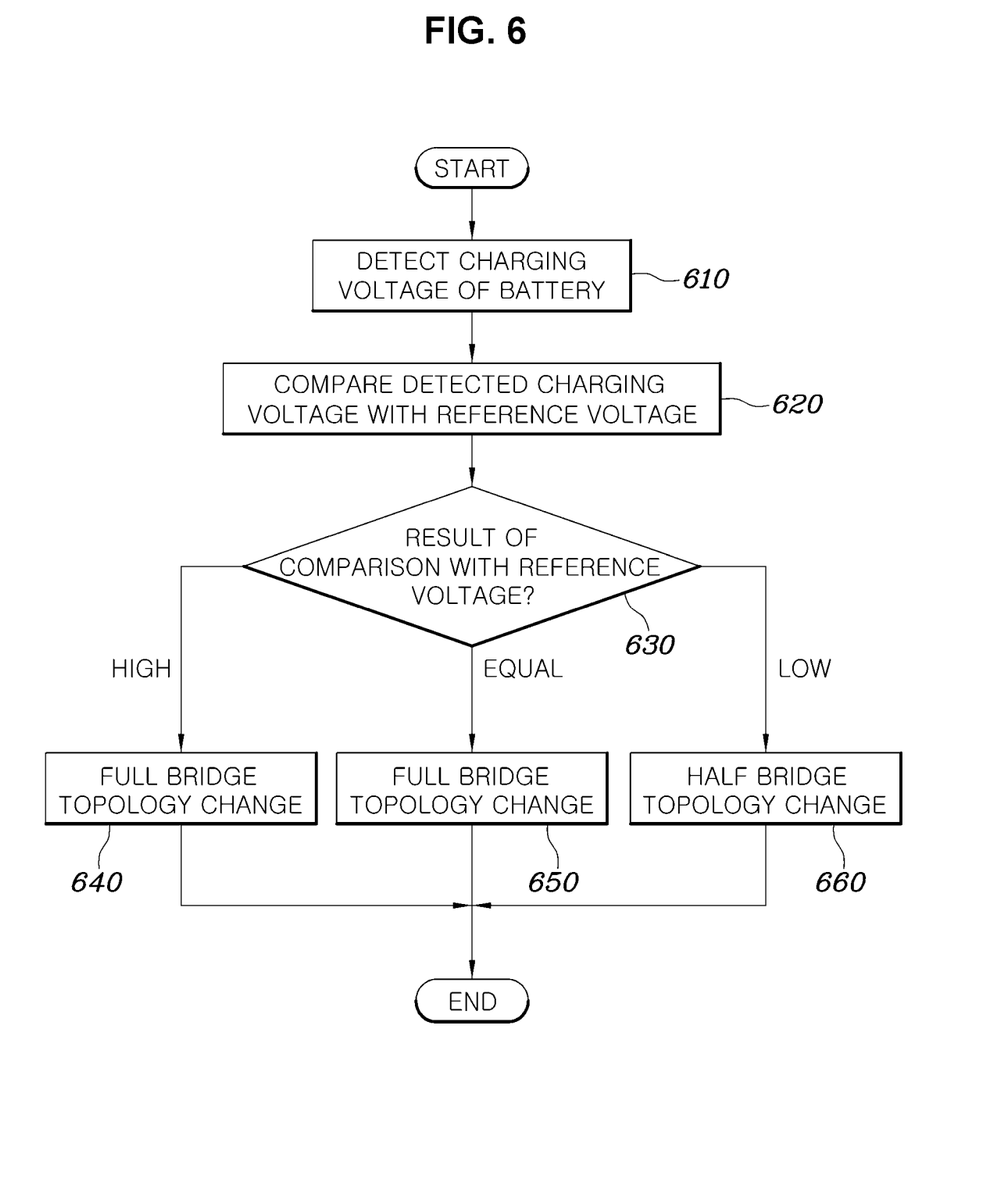
FIG. 6 is a flowchart of a method for controlling an LLC resonance converter according to another embodiment of the present disclosure.

FIG. 6 is a flowchart of a method for controlling an LLC resonance converter according to another embodiment of the present disclosure.

Referring to FIG. 6, the method for controlling an LLC resonance converter according to another embodiment may include detecting a charge measurement value of a battery, comparing the detected charge measurement value with a reference voltage, and changing a topology of a converter depending on the result of comparison with the reference voltage.

In step 610, the controller detects the charge measurement value of the battery being charged with a voltage converted through the converter.

In an embodiment of the present disclosure, the battery, from which the charge measurement value is detected, may be a main battery that plays a role of supplying a power of a motor. Further, the charge measurement value of the battery, which is the detection target, means the level of the voltage charged in the battery.

A method for detecting the charge measurement value of the battery is not limited, and may be easily adopted and used by an ordinary skilled person in the art.

In step 620, the controller compares the charge measurement value detected in step 610 with the reference voltage. In an embodiment of the present disclosure, the reference voltage may be a nominal voltage of a high-voltage battery. Meanwhile, in an embodiment of the present disclosure, the controller may not compare the charge measurement value detected in step 610 with the reference voltage, but may check which range of a predetermined voltage range the charge measurement value belongs to. For example, the predetermined voltage range may be divided into a low-voltage range, near a nominal voltage, and a high-voltage range.

In step 630, if the detected charge measurement value of the battery is smaller than the reference voltage (or if the charge measurement value belongs to the low-voltage range), the controller changes the topology of the converter so that the converter operates in the form of the half bridge at 660.

If the detected charge measurement value of the battery is equal to the reference voltage (or if the charge measurement value is near the nominal voltage), the controller changes the topology of the converter so that the converter operates in the form of the full bridge at 650.

If the detected charge measurement value of the battery is larger than the reference voltage (or if the charge measurement value belongs to the high-voltage range), the controller changes the topology of the converter so that the converter operates in the form of the full bridge at 640.

The converter according to an embodiment of the present disclosure may include a switching element unit 210 in which a plurality of switching elements 211, 212, 213, and 214 are connected to an input terminal to constitute a full bridge circuit, a resonance tank 220 being provided with a power formed by shorting and opening of the plurality of switching elements 211, 212, 213, and 214, a transformer 230 having a primary coil connected to the resonance tank 220 and a secondary coil connected to an output side to which a charging target is connected, and a rectifying circuit 240 connected to the secondary coil of the transformer 230.

In an embodiment of the present disclosure, in steps 630 to 650, the changing the topology of the converter of the controller may be performed by controlling the on/off of the plurality of switches disposed at the input terminal of the converter.

The controller may make the converter operate in the form of the half bridge by always opening the second switching element 213 and by always shorting the fourth switching element 214 among the first switching element 211 and the third switching element 213 connected in series to the first leg of the input terminal of the converter and the second switching element 212 and the fourth switching element 214 connected in series to the second leg of the input terminal.

Meanwhile, when the switching elements 211 and 214 among the plurality of switching elements 211, 212, 213, and 214 are turned on and off, respectively, the controller may make the converter 110 operate in the form of the full bridge by controlling the respective switching elements 211, 212, 213, and 214 so that the switching elements 212 and 213 are turned on and off, respectively.

In an embodiment of the present disclosure, if the charging status value of the high-voltage battery 140 is smaller than the reference voltage (or if the charging status value belongs to the low-voltage range), the controller may control the switching elements by making the switching frequency of the switching elements 211, 212, 213, and 214 lower than the resonance frequency.

For example, in order for an LLC converter of a full bridge structure to charge the high-voltage battery of 360V/20A, the controller should control the switching elements to have the switching frequency of 250 kHz at the link capacitor voltage of 570V, but the controller 120 can control the switching elements 211, 212, 213, and 214 so that an LLC converter of a half bridge structure has the switching frequency of 165 kHz, which is lower than the resonance frequency of 172 kHz, at the link voltage of 670V. As described above, by controlling the respective switching elements 211, 212, 213, and 214 at the switching frequency that is lower than the resonance frequency, the LLC converter of the half bridge structure can operate at the switching frequency in which a zero-current switch (ZCS) and a zero-voltage switch (ZVS) are all possible, and thus can operate with high efficiency and advantageous element heating features in a state where it is more optimized than the LLC converter of the full bridge structure.

In an embodiment of the present disclosure, if the voltage charged in the battery is equal to the reference voltage or is near the nominal voltage, the controller may control the switching frequency of the switching elements 211, 212, 213, and 214 to be equal to the resonance frequency, whereas if the voltage charged in the battery is higher than the reference voltage or is in the high-voltage range, the controller may control the switching elements so that the switching frequency of the switching elements 211, 212, 213, and 214 becomes lower than the resonance frequency.

The converter according to another embodiment of the present disclosure may be configured to include a switching element unit 210 in which a plurality of switching elements 211, 212, 213, and 214 are connected to an input terminal to constitute a full bridge circuit, a resonance tank 220 being provided with a power formed by shorting and opening of the plurality of switching elements 211, 212, 213, and 214, a transformer 230 having a primary coil connected to the resonance tank 220 and a secondary coil connected to an output side to which a charging target is connected, a rectifying circuit 240 connected to the secondary coil of the transformer 230, and a plurality of relays 310 and 320 disposed between the plurality of switching elements 211, 212, 213, and 214 and the resonance tank 220 to change a connection state between the plurality of switching elements 211, 212, 213, and 214 and the resonance tank 220 under the control of the controller 120.

The switching element unit 210 according to an embodiment of the present disclosure may be composed of a first switching element 211 and a third switching element 213 connected in series to a first leg of the input terminal, and a second switching element 212 and a fourth switching element 214 connected in series to a second leg of the input terminal, and the resonance tank 220 may be configured to have one end connected to the first leg between the first switch and the third switch and the other end connected to the second leg between the second switch and the fourth switch.

In an embodiment of the present disclosure, the plurality of relays 310 and 320 may include a first relay having one end connected to the second leg between the second switch and the fourth switch and the other end being able to be coupled to a first position A in which the other end is connected to the first leg between the first switch and the third switch or a second position B in which the other end is connected to the other end of the resonance tank under the control of the controller 120, and a second relay having one end connected to the other end of the resonance tank and the other end being able to be coupled to a third position C in which the other end is connected to the second leg between the second switch and the fourth switch and a fourth position D connected between the third switch and the fourth switch under the control of the controller.

In an embodiment of the present disclosure, in steps 630 to 650, the changing the topology of the converter of the controller may be performed by controlling the connection positions of the plurality of relays disposed at the input terminal of the converter.

The controller may make the converter operate in the form of the full bridge by controlling the relays 310 and 320 so that the other end of the first relay 310 of the converter is coupled to the second position B, and the other end of the second relay 320 is coupled to the third position C.

Meanwhile, the controller may make the converter 110 operate in the form of the half bridge by controlling the relays 310 and 320 so that the other end of the first relay 310 of the converter is coupled to the first position A, and the other end of the second relay 320 is coupled to the fourth position D.

In changing the topology of the converter according to the charge measurement value of the battery through the relay operations described above, since the relays 310 and 320 are inexpensive as compared with the switching elements, and in case of changing the topology of the converter 110 using the relays 310 and 320, there is a gain in the output current during the half bridge operation, the high-performance/high-efficiency half bridge LLC operation is possible at low costs.

Up to now, the present disclosure has been described around the preferred embodiments. Those of ordinary skill in the art will be able to understand that the present disclosure can be implemented in modified forms within the scope that does not depart from the intrinsic characteristics of the present disclosure. Accordingly, the disclosed embodiments should not be considered from the viewpoint of limitation, but should be considered from the viewpoint of explanation. The scope of the present disclosure is not presented in the above description, but is presented in appended claims, and all differences within an equivalent range should be interpreted to be included in the present disclosure.

The invention claimed is:

1. An apparatus for controlling an LLC resonance converter, the apparatus comprising:
 a converter connected to an input terminal, the converter including a plurality of switching elements constituting a bridge circuit, and the converter configured to enable a topology change in the form of a full bridge and a half bridge; and
 a controller configured to detect a charge measurement value of a battery being charged with a power transferred by the converter, and wherein the controller is configured to change a topology of the converter based on the charge measurement value;
 wherein the plurality of switching elements comprise first and third switches connected in series to a first leg of the input terminal, and second and fourth switches connected in series to a second leg of the input terminal; and
 wherein the converter further includes:
  a resonance tank having a first end connected to the first leg between the first and third switches, and a second end connected to the second leg between the second and fourth switches, and resonating through reception of a power formed by switching of the plurality of switching elements; and
  a plurality of relays positioned between the plurality of switching elements and the resonance tank;
 wherein the controller is configured to change the topology of the converter by controlling operations of the plurality of relays based on the charge measurement value;
 wherein the plurality of relays comprise:
  a first relay having a first end connected to the second leg between the second and fourth switches, and a second end being able to be coupled to a first position in which the second end of the first relay is connected to the first leg between the first and third switches, or a second position in which the second end is connected to the second end of the resonance tank under the control of the controller; and
  a second relay having a first end connected to the second end of the resonance tank, and a second end being able to be coupled to a third position in which the second end of the second relay is connected to the second leg between the second and fourth switches, and a fourth position connected between the third and fourth switches under the control of the controller.

2. The apparatus according to claim 1, wherein the controller is configured to change the topology of the converter by controlling on/off of the plurality of switching elements based on the charge measurement value.

3. The apparatus according to claim 1, wherein the controller is configured to change the topology of the converter to the half bridge when the detected charge measurement value is in a predetermined low voltage range.

4. The apparatus according to claim 1, wherein the controller is configured to change the topology of the converter to the full bridge when the detected charge measurement value is in a predetermined nominal or high voltage range.

5. The apparatus according to claim 1, wherein the controller changes the topology of the converter to a full bridge by controlling the plurality of relays so that the second end of the first relay is coupled to the second position, and the second end of the second relay is coupled to the third position.

6. The apparatus according to claim 1, wherein the controller changes the topology of the converter to a half bridge by controlling the plurality of relays so that the second end of the first relay is coupled to the first position, and the second end of the second relay is coupled to the fourth position.

7. A method for controlling an LLC resonance converter of claim 1, the method comprising:
 detecting the charge measurement value of the battery; and
 changing the topology of the converter transferring the power for charging the battery based on the detected charge measurement value.

8. The method according to claim 7, wherein the topology of the converter is the full bridge or the half bridge.

9. The method according to claim 8, wherein the changing the topology of the converter comprises changing the topology of the converter to the half bridge when the detected charge measurement value belongs to a predetermined low voltage range.

10. The method according to claim 8, wherein the changing the topology of the converter comprises changing the topology of the converter to the full bridge when the detected charge measurement value is a predetermined nominal voltage or belongs to a high voltage range.

11. The method according to claim 7, wherein the changing the topology of the converter is performed by controlling on/off of the plurality of switching elements disposed at the input terminal of the converter.

12. The method according to claim 7, wherein the changing the topology of the converter is performed by controlling on/off of the plurality of relays disposed at the input terminal of the converter.

* * * * *